CHARACTER RECOGNITION BY OPTICAL ALIGNMENT

Filed March 1, 1965 2 Sheets-Sheet 1

CHARACTER RECOGNITION BY OPTICAL ALIGNMENT

Filed March 1, 1965 2 Sheets-Sheet 2

INVENTOR
LEONARD F. WINTER
BY John B Visone
ATTORNEY

United States Patent Office 3,362,012

Patented Jan. 2, 1968

3,362,012

CHARACTER RECOGNITION BY OPTICAL ALIGNMENT

Leonard F. Winter, Dutchess County, N.Y., assignor to International Business Machines Corporation, Armonk, N.Y., a corporation of New York Filed Mar. 1, 1965, Ser. No. 436,077
8 Claims. (Cl. 340—146.3)

This invention relates to film scanners and more particularly to film scanners employing cathode ray tubes for scanning the film.

When a cathode ray tube is used to scan a film for determining the information contained thereon, the scanning technique employed may vary from one system to another. A television raster type scan may be employed with great accuracy and ease. However, where the scanner is used in conjunction with a computer and all of the costly peripheral equipment associated therewith, the raster type scan is disadvantageous since it is extremely wasteful of time. Numerous other schemes for scanning have been employed, however, in each instance the scheme employed provides some time disadvantage because each requires a complete scan of the character format for each character being read.

One of the objects of this invention is to provide a film scanner in which character scanning is terminated as soon as it has been determined with certainty that the character contained on the film does not coincide with the character being scanned on the cathode ray tube.

Another object of the invention is to provide a film scanner which is reliable in operation and inexpensive to manufacture.

A further object of the invention is to provide a film scanner which is capable of determining a character on a microfilm with as little scanning time as possible.

The invention contemplates a film scanner or reader which scans the film to determine the content on a character by character basis. Each character in the font used has a predetermined configuration which may be synthesized by drawing a plurality of sequential lines. Scanning is accomplished by generating the sequential lines of each of the characters in the font in sequence on a cathode ray tube. The light generated thereby impinges on the film as each line of the character is drawn. The light impinging on the film will be either transmitted or blocked. A detector provided on the opposite side of the film supplies one of two signals depending on the transmission characteristics of the film with respect to the line drawn on the tube. If the line is transmitted a first signal is provided which calls for the next sequential line to be drawn. This is repeated until such time as a complete character has been synthesized whereupon the identity of the character on the film has been established. If the first or a subsequent line is not transmitted, then a second signal is provided which calls for the next sequential character in the font. The characters in the font are called for sequentially until such time as a complete character is synthesized as described above.

The foregoing and other objects, features and advantages of the invention will be apparent from the following more particular description of a preferred embodiment of the invention as illustrated in the accompanying drawings.

Figure 1:
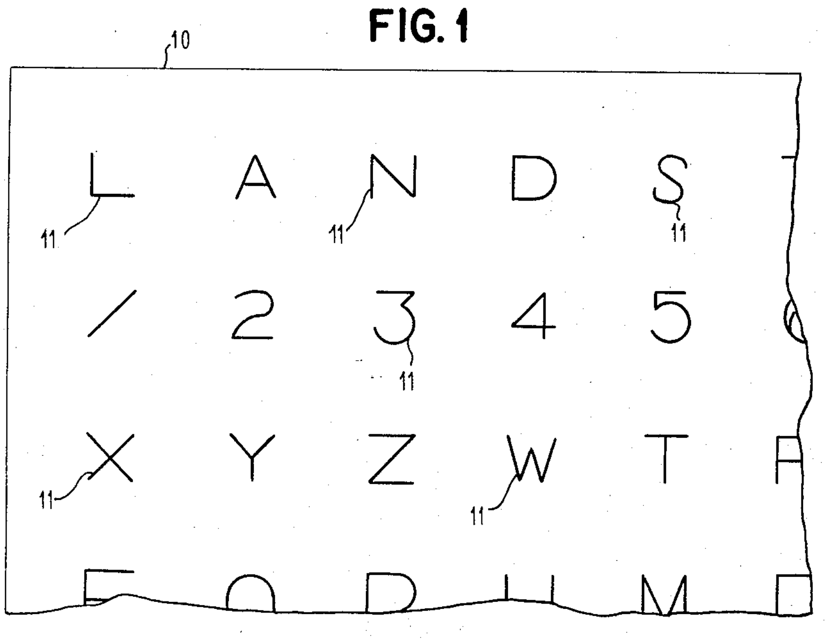
FIG. 1 is a schematic representation of the information contained on the microfilm.

In FIG. 1 reference numeral 10 designates a portion of a normally opaque microfilm frame which is being scanned. The characters are defined by translucent areas located on the film and are designated by numerals 11. In the device described a character is defined by a translucent area on the film, however, an opaque area on a normally translucent film may be employed and is fully equivalent. The film 10 is positioned between a cathode ray tube 14 shown in FIG. 3 and a photo multiplier tube 15 also shown in FIG. 3. The cooperation of cathode ray tube 14, film frame 10 and photo multiplier tube 15 will be described later in connection with the description of FIG. 3.

Figure 2:
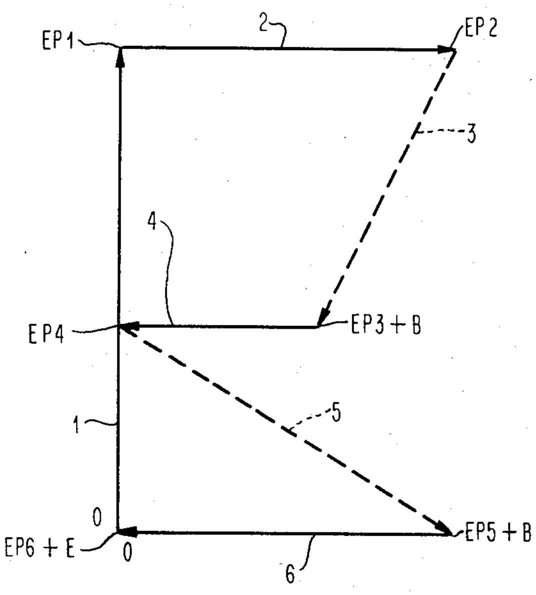
FIG. 2 is a schematic representation of the vectors employed in generating a character on the cathode ray tube.

The character E is illustrated in FIG. 2. It is made up from a plurality of sequentially generated vectors 1–6 inclusive. The vectors are numbered in the order in which they are drawn on the face of cathode ray tube 14. All characters start at a coarse coordinate position which is either determined manually or by a computer and is designated in FIG. 2 by the coordinate numbers 00. The character E is generated by selecting the endpoint EP1 shown in the figure and drawing a line with the beam on the face of the cathode ray tube 14 which extends from 00 to EP1. This is accomplished by adding the quantity 0 to the X coordinate of the coarse coordinate position and a quantity 8 to the Y coordinate of the coarse coordinate position. Endpoint EP2 determined by adding six to the previous X coordinate position and 0 to the previous Y coordinate position. On the third stroke the beam is blanked since it is moved through an area in which no line is desired. This is indicated in the drawings by the dashed line 3. The fourth stroke completes the center line of the E and the fifth stroke is blanked since again no indicia is desired in this area. The sixth stroke completes the bottom leg of the E and terminates at endpoint EP6 which coincides with the 00 point previously described. However, it is not necessary that a character terminate at the 00 point. It may terminate at any point within the square.

When the next character is to be read, the coarse positioning will place the beam in the same relative position with a different character area as just described. This coarse position may however bear some other designation such as 0′0′ to distinguish it from the one described above. All of the characters are generated in this manner. A further description of each of the characters in the font is unnecessary since the specific mode of generating the particular character font is not part of this invention.

Figure 3:
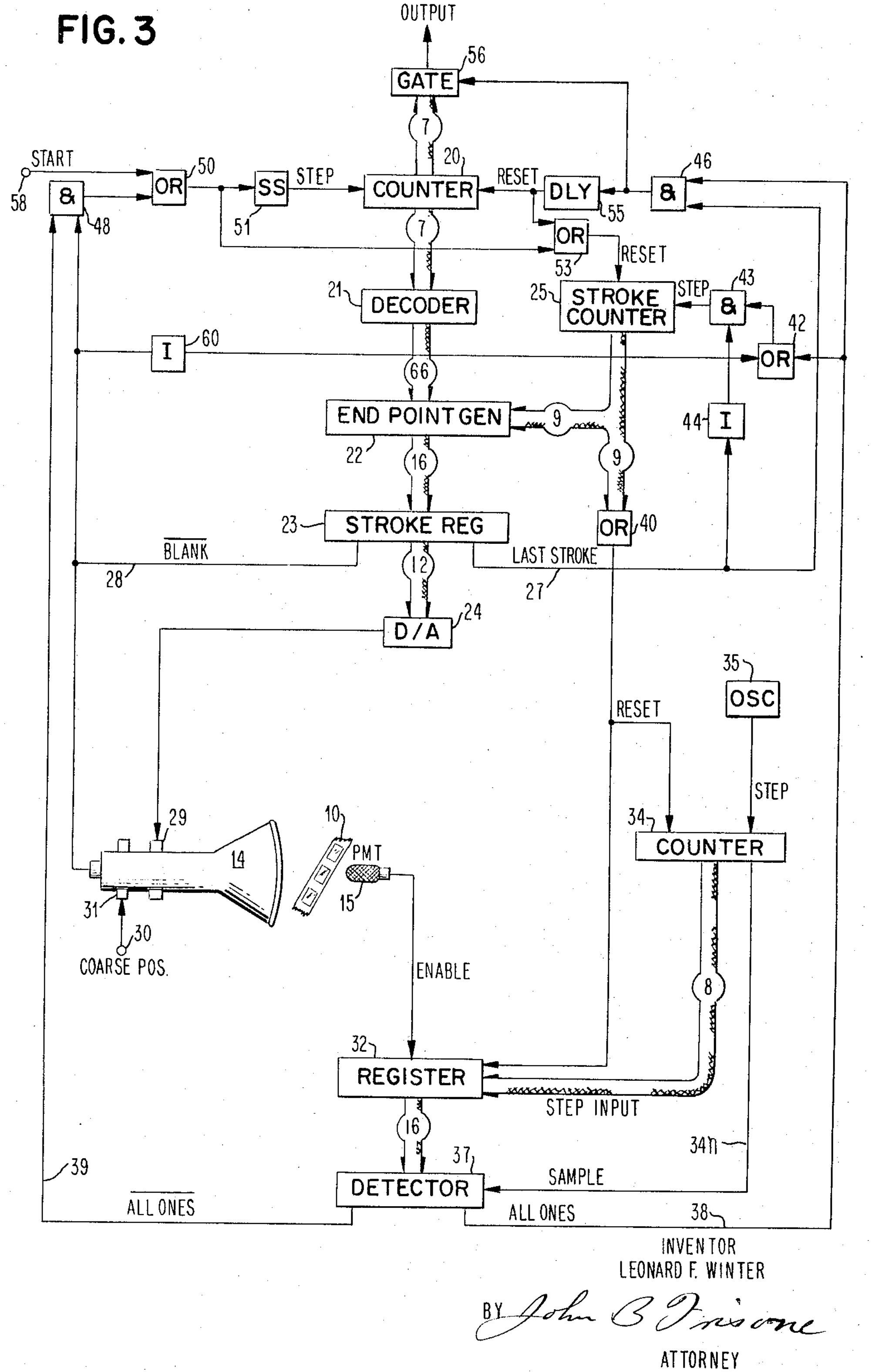
FIG. 3 is a schematic diagram of a novel film scanner constructed in accordance with the invention.

In FIG. 3 a counter 20 supplies one of a sequential group of unique coded signals to a decoder 21. The coded signal is applied to an endpoint generator 22 which generates the endpoints previously described in connection with FIG. 2. These endpoints are applied to a stroke register 23 which in turn drives the deflection circuits of cathode ray tube 14 through a digital to analog converter 24.

Counter 20 may have as many stages as are necessary to accommodate the font employed thus if 32 characters are employed in the font the counter need only provide 32 distinct codes. However, if 64 or more characters are employed the counter must be provided with a greater number of stages. Decoder 21 accepts the output of counter 20 and provides a single output on one of a number of output lines indicating the count on counter 20. The output of decoder 21 is thus a single line indicative of the count of counter 20 and further indicative of a particular character to be generated on the cathode ray tube 14.

This output is applied to the endpoint generator 22 which provides a number of sequential outputs each of which indicates the endpoint of the vector which the beam will trace. The sequence of the endpoints is controlled by a stroke counter 25 which provides nine sequential outputs. Counter 25 is provided with nine outputs since the font contemplated may require as many as nine strokes. If a different font is used the counter 25 must provide as many outputs as the maximum number of strokes required to generate the font. The first output from counter 25 gates the first endpoint of the character in counter 20 to stroke register 23. The second output line which follows the first in time sequence gates the second endpoint and so forth until the last line of the character is generated. The last line of the character in process will be accompanied by a last stroke output from the endpoint generator and will set a stage in stroke register 23 to provide an output on a line 27. With each endpoint, stroke register 23 has one stage which indicates whether or not a blank is desired for that stroke. Thus, a line 28 will be energized with a particular voltage indicating that the line is not to be blanked or another voltage indicating that the line is to be blanked. The use of this output will be described further on as the description of the device progresses.

Decoder 21, endpoint generator 22, stroke register 23 and stroke counter 25 together constitute a character generator which may be constructed as shown in copending application Ser. No. 436,078, filed Mar. 1, 1965, now U.S. Patent No. 3,334,304, by R. J. Fournier et al., and assigned to the same assignee as this application. Decoder 21 is equivalent in function to decoder 14 of FIGURE 1 in the said copending application. Endpoint generator 22 may be identical to the endpoint generator 16 shown in FIGURES 1 and 3 of said copending application and the stroke register 23 is equivalent to stroke register 28 and endbit register 24 which are shown physically separated in the copending application. Stroke counter 25 performs the same function as the ring counter 18 of the said copending application, however, control of counter 25 differs as illustrated in FIGURE 3 of this application and herein elsewhere described.

Stroke register 23 contains in sequence, under the control of stroke counter 25, the endpoints previously described above with respect to FIGURE 2. The first endpoint is applied to digital to analog converter 24 which provides analog voltage outputs indicative of the endpoint. This output is applied to a first deflection circuit 29 associated with cathode ray tube 14. The coarse positioning is applied either manually or from a central processor to an input terminal 30 and from there to a second deflection circuit 31. The coarse position thus applied corresponds to the coordinate positions 00 previously described above with respect to FIGURE 2. At this point, the first line of the character is drawn on the face of the cathode ray tube 14. If the line thus drawn is in registration with a transparent line on film 10 the photo multiplier tube 15 will provide an output to a register 32.

Register 32 is provided with a number of stages to sample the output of tube 15 a number of times. Sampling is accomplished by a counter 34 which is pulsed by an oscillator 35 and will thus provide a number of successive outputs during the time it takes to generate a single stroke on cathode ray tube 14. Thus, if there is full coincidence of the line, register 32 will provide an output on each stage. On the last pulse from counter 34 a detector 37 samples the output of register 32 to determine if the register is all ones or not all ones. If the register is all ones detector 37 provides an output on a line 38 indicative of that condition. If it does not contain all ones it provides an output on a line 39 indicative of that condition.

The reset inputs of counter 34 and register 32 are connected through an OR gate 40 to the outputs of counter 25. Thus at the beginning of each stroke the register and counter 34 are reset in order to properly sample the comparison as previously described.

If the first line drawn on cathode ray tube 14 coincides with a transparent line on film 10 the all ones condition will energize conductor 38. This output is fed back to an OR circuit 42 and from there to an AND gate 43. Since this was the first stroke and not the last stroke the last stroke output will be down. However, it is applied through an inverter 44 to AND gate 43. Therefore, upon the occurrence of the all ones condition on conductor 38 stroke counter 25 is stepped to the second position and the second stroke will commence. Conductor 38 is also connected to an AND gate 46. However, this AND gate is inactive on the first stroke since it is connected to the last stroke line 27 which is not at this time properly energized for conduction through gate 46.

During the second stroke the operation previously described is repeated. However, assuming that the second stroke results in a lack of coincidence between the line written on cathode ray tube 14 and a transparency on the film, the output from detector 37 will be "not all ones" on line 39. This line is connected to an AND gate 48 which has another input connected to the line 28 from stroke register 23. If the second stroke was not a blank, AND gate 48 provides an output which is applied to an OR gate 50 which in turn energizes a single shot generator 51 which steps counter 20 to the second position. The second position will start the scan of a new character.

The output of OR gate 50 is also applied to an OR gate 53 which is connected to the reset input of stroke counter 25 to reset the stroke counter so that the first stroke of the second character will be generated. This process continues until such time as the character code from counter 20 generates a character on tube 14 which coincides with the character being examined on film 10. At that time the all ones line will have come up successively for each of the strokes until the last stroke signal appears on the conductor 27. As a consequence of the concurrent occurrence of a last stroke signal and an all ones signal on conductor 38 an output will be developed at AND gate 46 which is applied through a delay circuit 55 to the reset input of counter 20. This will reset counter 20 to the zero position. Delay circuit 55 is provided so that the output of counter 20 may be gated out through a gate 56 to a utilization device not shown before the counter is reset. At this time stroke counter 25 must be reset so that it is ready to process the next scan, thus, the output of delay circuit 55 is applied to the reset input of stroke counter 25 through OR gate 53.

Once counter 20 is reset to the zero position the circuit operation ceases, since endpoint generator 22 is arranged to indicate a blank and last stroke when counter 20 is reset to zero. A signal applied to start terminal 58 will commence operation of another scan similar to the scan previously described.

Conductor 28 is connected via an inverter circuit 60 to OR gate 42 and thus through AND gate 43 to stroke counter 25. This connection is necessary since a blanked stroke will not produce an output on conductor 38 for stepping stroke counter 25. Thus the blank output derived by inverting the output on conductor 28 is utilized to step the stroke counter 25 so that the next stroke of the character being generated may be accomplished.

In summary, at the completion of a scanning operation counter 20 is reset and as previously described this stops further scanning. Thus a new scanning operation must be started by applying a pulse to the start input terminal 58, either manually or automatically. This is preceded by applying a new coarse position from a computer or manually to terminal 30 to reposition the beam in tube 14 to a new starting point 00. The pulse applied at terminal 58 steps counter 20 to the first count. This is decoded in decoding circuit 21 and provides an output on the first conductor which is representative of one of the characters in the font. Endpoint generator 22 at this point provides the coordinates of the endpoints of the first stroke and these are gated out into the stroke register 23 by the stroke counter 25.

Analog to digital converter 24 converts the digital endpoint coordinate information from register 23 into analog voltages which are applied to the deflection circuit 29 of the cathode ray tube 14 to execute the first stroke. If the first stroke is successful, that is, a coincidence of a line on the film with the stroke line executed on the cathode ray tube the all ones conductor 38 is properly energized. This energization is applied through OR gate 42 and AND gate 43 to stroke counter 25. AND gate 43 is enabled since stroke register 23 does not record a last stroke. Counter 20 remains unchanged and each of the strokes necessary to complete the character are generated in turn by stroke counter 25. However, if a stroke generated on the cathode ray tube 14 does not coincide with a transparent line on film 10 the output on conductor 39 indicating "not all ones" provides another character. This is accomplished by stepping counter 20 through AND gate 48, OR gate 50 and single shot generator 51 provided a blank is not called for. This process will continue until a successful comparison of the character generated and the character on the film 10 is achieved at which point as previously described the contents of counter 20 are gated out to a utilization circuit.

Gating is accomplished by the output on conductor 38 which indicates an all ones and the last stroke signal generated in stroke register 23. These two signals are applied to AND gate 46 which develops an output for operating gate 56 which transmits the information in counter 20. The output of AND gate 46 is delayed in circuit 55 and is then utilized to reset counter 20 back to the zero position and to reset stroke counter 25. Thus the circuit is ready to accept another scan to determine the next character on the film.

If, as previously described, an opaque area 11 on a normally translucent film 10 defines the character the connections of conductors 38 and 39 must be reversed since a "not all ones" indicates coincidence and an "all ones" indicates a lack of coincidence.

In a preferred embodiment of the invention counter 20 has seven stages thus providing 128 unique codes including zero. Decoder 21 decodes only the first 66 of the available codes since there are only 66 characters in the font used. Stroke counter 25 has 9 stages since the maximum number of strokes required to generate any character in the font is 9. Endpoint generator 22 provides 8 bipolar outputs. One for indicating a blank to be written on the cathode ray tube. One for indicating the last stroke of a character. Three for defining the X coordinate of the stroke endpoint and three for defining the Y coordinate of the endpoint. Stroke register 23 is an 8 stage static register with bipolar outputs, two of which are indicated by inverters 44 and 60. Digital to analog converter 24 provides two analog voltages corresponding to the digital X and Y coordinates supplied by stroke register 23. Counter 34 is an 8 stage counter reset by each output of stroke counter 25 and stepped by a free running oscillator 35 which is adjusted in frequency to provide 8 steps between successive strokes. Register 32 is an 8 stage static register with bipolar outputs and detector 37 is an OR gate connected to the "zero" output of each of the stages of register 32 and an AND gate connected to the "one" output of each stage of register 32. The OR gate provides a not all ones output on conductor 39 when strobed on the 8th pulse from counter 34 while the AND gate provides the all ones output on conductor 38.

While the invention has been particularly shown and described with reference to a preferred embodiment thereof, it will be understood by those skilled in the art that various changes in form and detail may be made therein without departing from the spirit and scope of the invention.

What is claimed is:

1. A film scanner comprising first means for generating, in response to sequential control signals, a plurality of uniquely coded signals each of which represents a different character of the font recorded on the film, second means responsive to said first means for converting each of the sequentially generated coded signals to a plurality of sequential endpoint signals representative of the physical location of a plurality of line segments which when generated in sequence define the character of the recorded font corresponding to the coded signal, said second means including a timing control circuit means for controlling the time sequential generation of the endpoint signals, a cathode ray tube, third means responsive to the time sequential endpoint signals for controlling said cathode ray tube to cause said tube to write a single line between the then attained beam position and the endpoint corresponding to the time sequential endpoint signal applied to the third means, fourth means positioned opposite the cathode ray tube for receiving the light energy from the tube passing through the film to be read and for generating a predetermined plurality of signals for each line on the cathode ray tube in light transmitting alignment with a transparent line on the film, and fifth means responsive to the fourth means for detecting the absence of said generated plurality of signals from said fourth means for providing said sequential control signals to cause said first means to shift to the next sequential character as soon as a line drawn on the cathode ray tube fails to correspond to a line on the film and simultaneously therewith reset the control circuit included in the second means and in the presence of said generated plurality of signals from said fourth means for stepping said control circuit to generate the next sequential line of the character in process.

2. A film scanner comprising a counter for generating a plurality of uniquely coded signals each of which represents a different character of the font recorded on the film in response to sequential control signals;

a character generator responsive to said counter for converting each of said sequentially generated coded signals to a plurality of sequential endpoint signals each representative of the physical location of one of a plurality of line segments which when sequentially generated define the character of the recorded font corresponding to the coded signal;

a cathode ray tube;

a digital to analog converter for converting the signals from said character generator to analog voltages for causing the beam in the cathode ray tube to trace the lines forming the character in the font;

first means positioned opposite the cathode ray tube for receiving the light energy from the tube which passes through the film to be read and for generating a predetermined plurality of signals for each line of the cathode ray tube in light transmitting alignment with a transparent line on the film and, second means responsive to the first means for detecting the absence of the generated plurality of signals from the first means for providing the said sequential control signals to cause the counter to shift to the next sequential character as soon as a line drawn on the cathode ray tube fails to correspond to a line on the film, and in the presence of said generated plurality of signals from said first means for stepping the character generator to the next sequential line of the character in process.

3. A film scanner as set forth in claim 2 in which said first means comprises a photo multiplier tube for generating an output signal when light energy from the face of the cathode ray tube passes through a light transmitting portion of the film in alignment with the light source on the face of the cathode ray tube;

a register responsive to the photo multiplier tube;

a counter for generating a plurality of outputs for stepping the register when it is enabled by the photo multiplier tube to provide the plurality of signals for each line on the cathode ray tube in light transmitting alignment with a transparent line on the film.

4. A film scanner as set forth in claim 3 in which said second means responsive to the first means for detecting the absence of said generated plurality of signals is a circuit for detecting the all ones condition in the register and for providing in the presence of all ones a first output indicative of that condition and a second output in the absence of all ones indicative of the condition;
- said first output being used for stepping the character generator to the next line of the character in process and,
- said second output being the said sequential control signal applied to the counter for stepping the counter to provide the next uniquely coded signal.

5. A film scanner comprising first means for generating, in response to sequential control signals, a plurality of the uniquely coded signals each of which represents a different character of the font recorded on the film;
- second means responsive to said first means for converting each of the sequentially generated coded signals to a plurality of sequential endpoint signals representative of the physical location of a plurality of line segments which when generated in sequence define the character of the recorded font corresponding to the coded signal,
- said second means including a timing control circuit means for controlling the time sequential generation of the endpoint signals,
- a cathode ray tube,
- third means responsive to the time sequential endpoint signals for controlling said cathode ray tube to cause said tube to write a single line between the then attained beam position and the endpoint corresponding to the time sequential endpoint signal applied to the third means,
- a photo multiplier tube positioned opposite the cathode ray tube for receiving the light energy from the tube passing through the film to be read and for generating an output when receiving such light transmission,
- a register responsive to the photo multiplier tube output,
- a counter for generating a plurality of outputs for stepping the register when it is enabled by the photo multiplier tube output to provide a plurality of signals for each line on the cathode ray tube in light transmitting alignment with a transparent line on the film,
- and a detector responsive to the register outputs for detecting an all ones condition in the register and for providing in the presence of said all ones condition a first output and a second output in the absence of the all ones condition, said first output being applied to the said timing control circuit for controlling the time sequential generation of the endpoint signals and said second output being the said sequential control signal applied to the first means for controlling the sequential generation of a plurality of uniquely coded signals.

6. A film scanner for reading information recorded on a film comprising means for generating a plurality of time sequential endpoint signals representative of the physical location of a plurality of line segments which when generated in sequence define the character of the recorded font;
- a cathode ray tube;
- means responsive to the time sequential endpoint signals for controlling said cathode ray tube to cause said tube to write successive lines starting from an initial position to successive endpoints corresponding to the time sequential endpoint signals;
- sensing means positioned opposite the cathode ray tube for sensing the alignment of each line of a character on the film with corresponding lines drawn by the cathode ray tube and generating signals indicative of the alignment thereof, and
- means responsive to a signal generated by said sensing means for indicating nonalignment of a line on the film with a line drawn by the cathode ray tube for controlling said generating means to generate a new character so that as soon as a line drawn on the cathode ray tube fails to correspond to a line on the film the generation of the next sequential character will be initiated for comparison with the character on the film.

7. A film scanner for reading information recorded on a film comprising means for generating a plurality of time sequential endpoint signals representative of the physical location of a plurality of line segments which when generated in sequence define the character of the recorded font;
- a cathode ray tube;
- means responsive to the time sequential endpoint signals for controlling said tube to cause the tube to write successive lines starting from an initial position to successive endpoints corresponding to the time sequential endpoint signals;
- sensing means positioned opposite the cathode ray tube for sensing the alignment of each line of a character on the film with corresponding lines drawn by the cathode ray tube and generating signals indicative of the alignment thereof, and
- means responsive to the signal generated by said sensing means for indicating alignment of a line on the film with the line drawn by the tube for controlling said generating means to generate the next time sequential endpoint of the character and for indicating nonalignment of a line on the film with the line drawn by the tube for controlling said generating means to generate a new character so that as soon as a line drawn on the tube fails to correspond to a line on the film the generation of the next sequential character will be initiated for comparison with the character on the film.

8. A film scanner for reading information recorded on a film comprising means for generating, in response to a first control signal, a plurality of uniquely coded signals each of which represents a different character of the font recorded on the film;
- means responsive to said generating means and to a second control signal for converting each of the sequentially generated coded signals to a plurality of time sequential endpoint signals representative of the physical location of a plurality of line segments which when generated in sequence define the character of the recorded font corresponding to the coded signal;
- a cathode ray tube;
- means responsive to the time sequential endpoint signals for controlling said cathode ray tube to cause said tube to write successive lines starting from an initial position to successive endpoints corresponding to the time sequential endpoint signals; and
- sensing means positioned opposite the cathode ray tube for sensing the alignment of each line of a character on the film with corresponding lines drawn by the cathode ray tube for generating said second control signal when alignment exists and said first control signal when alignment does not exist.

References Cited

UNITED STATES PATENTS 2,939,632 6/1960 Demer et al. -------- 235—61.1

MAYNARD R. WILBUR, *Primary Examiner.*

J. I. SCHNEIDER, *Assistant Examiner.*